United States Patent Office 3,337,357
Patented Aug. 22, 1967

3,337,357
NEW ULTRA-VIOLET LIGHT STABILIZED COMPOSITIONS, PROCESSES FOR PREPARING SAME AND USES THEREOF
Albert F. Strobel, Delmar, and Sigmund C. Catino, Castleton, N.Y., assignors to General Aniline & Film Corporation, New York, N.Y., a corporation of Delaware
No Drawing. Filed Mar. 9, 1960, Ser. No. 13,706
22 Claims. (Cl. 106—178)

This application is a continuation-in-part of our application Ser. No. 788,529, filed Jan. 23, 1959 and now abandoned.

This invention relates to new and useful compositions which are characterized as having superior resistance to degradation and deterioration when exposed to actinic radiation and in particular to organic compositions which are protected against deterioration when exposed to such radiations by the incorporation therewith of α-cyano-β,β-diphenylacrylic acid derivatives. This invention further relates to processes for preventing the deterioration and degeneration of organic materials when exposed to actinic radiations, and in particular to ultra-violet radiations. This invention still further relates to processes for the stabilization against deterioration by ultra-violet light of organic materials by the use of α-cyano-β,β-diphenylacrylic acid derivatives.

Various organic compounds exhibit the power to absorb electromagnetic radiations within the band of 2900 to 3700 A. and when incorporated in various plastic materials such as transparent sheets, the resultant sheet acts as a filter for all of the radiation passing through and will transmit only such radiations as are not absorbed by the sheet and/or the absorbing agent. It is thus possible to screen out undesirable radiations and utilize the resulting transparent sheet as a filter in many technical and commercial applications such as wrappings for food products and the like.

Numerous organic compounds have been suggested as absorbents for the range of radiations described above, which range is designated as the ultra-violet range. Such uses include incorporation in plastic sheet materials and the stabilization in general of transparent plastic bodies. By far, the greatest concern with respect to ultra-violet radiations is with those radiations which come from the sun. Most of these radiations have wave lengths between 250 and 400 millimicrons. The effects of such radiation on the human skin, producing sunburn and suntan, are of course well known. Other effects, however, of great commercial importance relate to the photochemical degradation caused by ultra-violet radiation. Many commercial products are either unstable when subjected to such radiations, or are affected to the extent that they become undesirable or unsalable. Many plastic materials, when exposed to this radiation, undergo substantial degradation resulting in the development of undesirable color bodies and subsequent loss of transparency. Food products, in addition to becoming discolored, often become unfit for human consumption. Thus, prolonged exposure of fruits, edible oils, butter and other prepared foods will spoil and turn rancid on exposure to ultra-violet light. It is well known that colored objects such as dyed textiles will fade on exposure to sunlight, and in particular to ultra-violet light. Many plastics, in addition to developing color formation and reduction in transparency, becomes brittle, lose their elasticity, crack and eventually completely deteriorate on exposure to sunlight. Paints, varnishes, lacquers and the like also are prone to these effects, even though here the transparency property may not be paramount.

We have discovered that by combining α-cyano-β,β-diphenylacrylic acid derivatives with organic materials, there results compatible combinations with a vast number of film forming plastics, resins, gums, waxes and the like, which combinations further exhibit outstanding ultra-violet absorbing properties within the generally encountered ultra-violet region of 250 to 400 millimicrons. The compounds which are employed in the compositions and processes of this invention, even though they exhibit outstanding absorbing properties close to the visible region of the electromagnetic field, nevertheless are essentially colorless compounds and can be employed with the assurance that they will not contribute to color in normally colorless formulations, nor will they affect the color of a colored formulation such as a paint film or a dyed textile. Many of the compounds employed in the compositions and processes of this invention also absorb some visible light on the violet end of the spectrum which renders them particularly useful in many formulations which are susceptible to visible light degradation. Thus polyesters and polyethylene are known to be so characterized, and the stabilization of these materials is extremely successful when using the compounds herein contemplated.

The compounds of this invention, additionally, are outstanding in that they do not require a phenolic hydroxyl group in order to achieve light stability. The heretofore used hydroxybenzophenone absorbers must have such a grouping. The presence of an hydroxyl which is capable of salt formation renders these absorbers unsuitable for use in alkaline media and particularly in alkaline plastic materials such as epoxys, melamines and the like. While the compounds employed in the compositions of the present invention do not require an hydroxyl group, the presence thereof is not a disadvantage, or detriment where alkaline sensitivity is no problem.

It is therefore an object of the present invention to provide new and useful compositions characterized by improved resistance to degradation and deterioration by ultra-violet radiation.

It is still another object of this invention to provide compositions containing α-cyano-β,β-diphenylacrylic acid derivatives which are resistant to ultra-violet deterioration.

It is a still further object of this invention to provide processes for improving the resistance of organic materials to deterioration and degradation by actinic radiation and especially ultra-violet radiation.

It is a still further object of this invention to provide compositions and processes for improving the resistance of organic materials to deterioration and degradation by actinic radiations including short wave length visible radiations.

Other objects and advantages will appear hereinafter as the description proceeds.

The α-cyano-β,β-diphenylacrylic acid derivatives which are employed in the compositions and processes of this invention are devoid of nitro groups and are characterized by the following general formula:

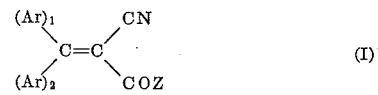

wherein $(Ar)_1$ and $(Ar)_2$ represent aromatic carbocyclic nuclei devoid of nuclear bonded amino groups and wherein Z may be OY or

and Y, $Y_1$ and $Y_2$ may be hydrogen or any organic radical, $(Ar)_1$ and $(Ar)_2$ may be unsubstituted or substituted provided in the latter case there are no nitro groups or nuclear bonded amino groups. It is preferred that $(Ar)_1$ and $(Ar)_2$ be phenyl or substituted phenyl to yield compounds of the formula:

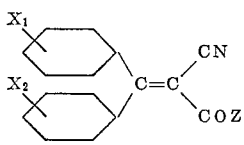

(II)

wherein Z has the meaning designated above and $X_1$ and $X_2$ may be the same or different from the following:

alkyl, e.g.,
- methyl
- ethyl
- n-propyl etc.

halogen, e.g.,
- chloro
- bromo
- fluoro
- iodo hydroxy alkoxy, e.g.
- methoxy
- ethoxy
- n-propoxy etc.

aryl

The following specific substituents for Y, $Y_1$, and $Y_2$ may be employed in the above formulations:

methyl
ethyl
n-propyl
iso-propyl
n-butyl
iso-butyl
n-amyl
iso-amyl
hexyl
heptyl
n-octyl
nonyl
decyl
lauryl
stearyl and the like
allyl
methallyl
cyanoethyl
cyano-n-propyl
cyano-isopropyl
cyano-n-butyl
cyano-isobutyl
cyano-n-amyl
cyano-isoamyl
cyanohexyl
cyanoheptyl
cyano-n-octyl
cyano-nonyl
cyanodecyl
cyanolauryl
cyanostearyl and the like
hydroxyethyl
hydroxy-n-propyl
hydroxy-isopropyl
hydroxy-n-butyl
hydroxy-isobutyl
hydroxy-n-amyl
hydroxy-isoamyl
hydroxy-hexyl
hydroxy-heptyl
hydroxy-nonyl
hydroxy-decyl
hydroxy-lauryl
hydroxy-stearyl and the like
carbomethoxyethyl
carbomethoxypropyl
carbomethoxybutyl
carbomethoxyamyl
carbomethoxyhexyl
carbethoxyethyl
carbethoxypropyl
carbethoxybutyl, etc.
carbopropoxyethyl
carbopropoxypropyl
carbopropoxybutyl, etc.
carbobutoxyethyl
carbobutoxybutyl, etc.
chloroethyl
chloropropyl (N-propyl, isopropyl)
chlorobutyl (N-butyl, isobutyl, etc.)
chloroamyl
chlorohexyl
chlorodecyl
chlorolauryl, and the like
bromoethyl
bromopropyl (N-propyl, isopropyl)
bromobutyl (N-butyl, isobutyl, etc.)
bromoamyl
bromohexyl
bromodecyl
bromolauryl, and the like.
methoxyethyl
methoxypropyl (N-propyl, isopropyl)
methoxybutyl (N-butyl, isobutyl, etc.)
methoxyamyl
methoxyhexyl
methoxydecyl
methoxylauryl, and the like.
ethoxyethyl
ethoxypropyl (N-propyl, ispropyl)
ethoxybutyl (N-butyl, isobutyl, etc. )
ethoxyamyl
ethoxyhexyl
ethoxydecyl
ethoxylauryl, and the like.
polyhydroxyalkyl, e.g., glyceryl
heterocyclics
- furyl
- tetrahydrofurfuryl
- benzofuryl
- thienyl
- pyrryl
- pyrollidyl
- 2-pyrollidonyl
- inodlyl
- carbazolyl
- oxazolyl
- thiazolyl
- pyrazolyl
- pyridyl
- pyrimidyl
- quinolyl, and the various alkyl, alkoxy, halo, nitro, carboxy, carboxalkoxy, acyl, and acylamino, derivatives of the aforementioned heterocyclic radicals aryls
- phenyl
- α-naphthyl, β-naphthyl
- α-anthracyl, β-anthracyl, γ-anthracyl
- cumyl
- phenanthranyl
- anisole
- phenetole
- tolyl
- p-diethoxyphenyl
- 1-methoxy phenanthryl
- β-naphthyl methyl ether
- β-naphthyl, ethyl ether
- hydroxyethyl phenyl
- hydroxypropyl phenyl
- α-(hydroxyethyl)naphthyl aryls—Continued
   chlorophenyl
   bromophenyl
   1,2-dichlorophenyl
   1,3-dichlorophenyl
   1,3,5-trichlorophenyl
   1,2-dibromophenyl
   o-chlorotolyl
   m-chlorotolyl
   m-bromotolyl
   bromo-o-xylyl
   α,β-dichloro naphthyl
   4-bromoacenaphthyl
   nitrophenyl
   o-nitrotolyl
   p-nitrotolyl
   4-nitroacenaphthyl
   3-nitrophenanthryl
   carboxyphenyl
   carboxytolyls
   carboxyxylyls
   carbalkoxylphenyls, e.g., carbomethoxylphenyl, carboethoxylphenyl
   carbalkoxytolyls, e.g., carbomethoxytolyls
   acetophenyl
   propiophenyl
   butyrophenyl
   lauroylphenyl
   p-acetotolyl
   benzoyl naphthyl
   acetaminophenyl
   acet-methylamino phenyl
   acetoaminotolyls
   acetoaminonaphthyls
   propio-aminophenyl
   propio-aminotolyls, and the like.
   sulfamyl phenyl In addition to the above contemplated derivatives, polyoxyalkylated derivatives thereof are within the purview of this invention. Any of the aforementioned derivatives containing at least one reactive hydrogen atom may be reacted with an alkylene oxide or a compound functioning as an oxide such as ethylene oxide, propylene oxide, butylene oxide, butylene dioxide, cyclohexane oxide, glycidol, epichlorohydrin, butadiene dioxide, isobutylene oxide, styrene oxide and mixtures thereof, and the like to yield the corresponding polyoxyalkylated product. Among the types of compounds which are reactive in this manner are the following: alcohols, amides, substituted amides, amines, sulfonamides, to yield compounds of the following general types:

(1) From alcohols of the formula $W-(OH)_m$ wherein $W(OH)_m$ represents compounds of formulae (I) and (II) and $p$ the number of hydroxyls, there results compounds of the formula:

$$W(OH)_m \cdot (XO)_n \qquad (III)$$

wherein (XO) represents the oxyalkyl chain and $n$ the number of moles thereof from 1 to about 100 reacted with the parent compound. Where $m$ is greater than 1, the oxyalkyl groups may be reacted with all of the hydroxyls or any selected number of them, and further, where more than one hydroxyl is oxyalkylated, the number of oxyalkyl groups may be different on each reactive site.

(2) From amides, substituted amides, sulfonamides, substituted sulfonamides, amines or substituted amines of the general formulae:

(a) 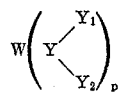

(b) 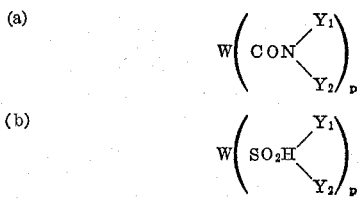

and (c) 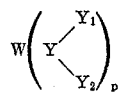

wherein Formulae (a), (b) and (c) represent compounds of Formulae (I) and (II) and $Y_1$ and $Y_2$ may be any selected substituent at least one containing a reactive hydrogen; $Y_1$ and $Y_2$ may be hydrogen, alkyl, aryl, hetero, and substituted forms thereof and $p$ the number of groups present, there results compounds of the formulae:

(a) 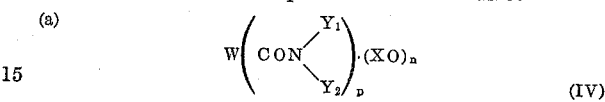 (IV)

(b) 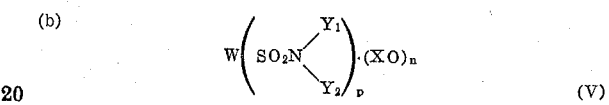 (V)

and (c) 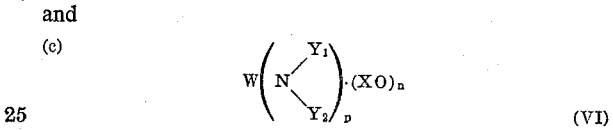 (VI)

wherein $Y_1$, $Y_2$ and $p$ are as above designated and $(XO)_n$ is similarly defined as in the alcohol reaction products. As with the alcohols the oxyalkyl groups may react with all active hydrogens present or any selected number, and again the total chain length of the oxyalkyl substituent may be different on each reactive site.

The following types of compounds are illustrative of polyoxyalkylated derivaties of parent compounds of Formula (II):

1. 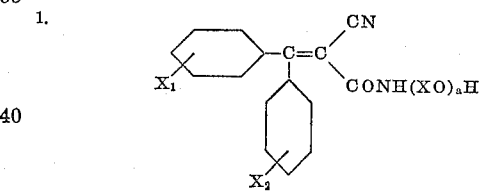

2. 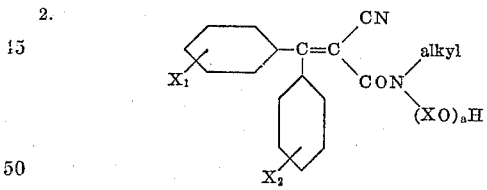

3. 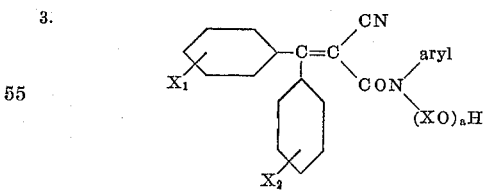

4. 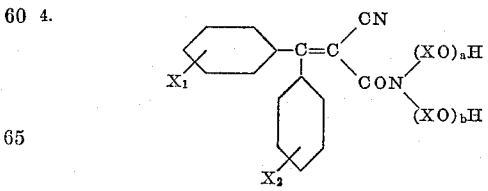

5. 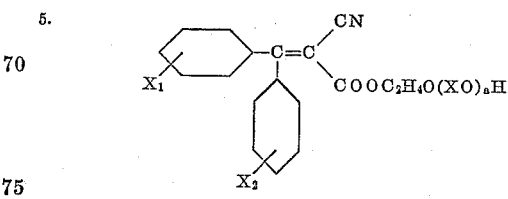

6. 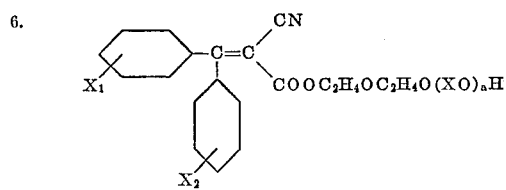
7. 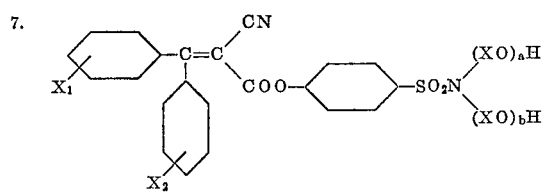
8. 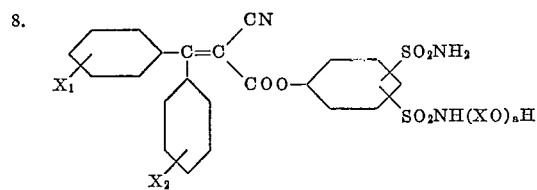
9. 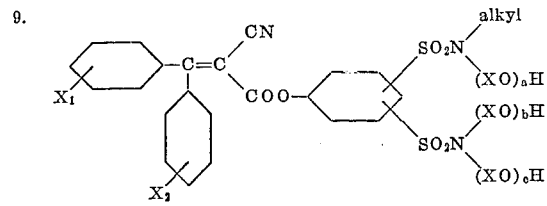
10. 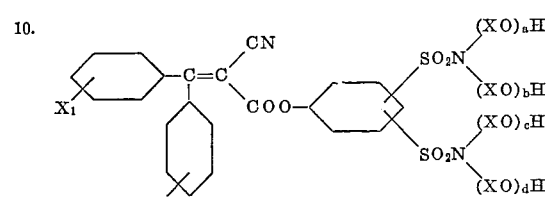
11. 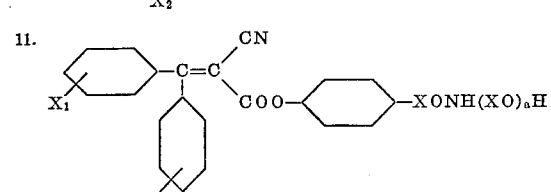
12. 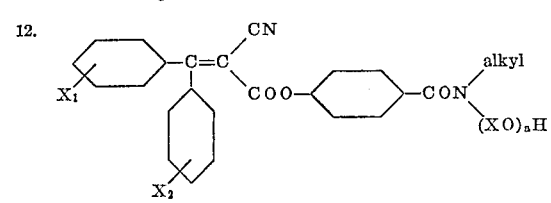
13. 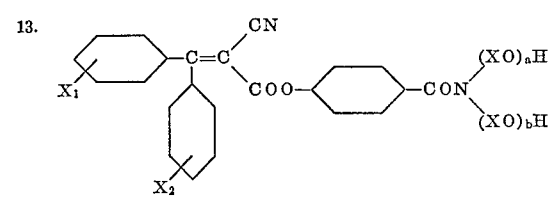
14. 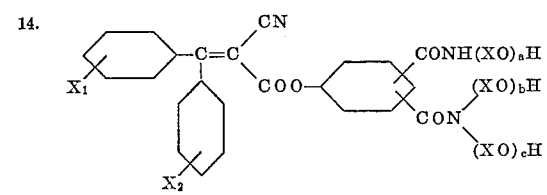
15. 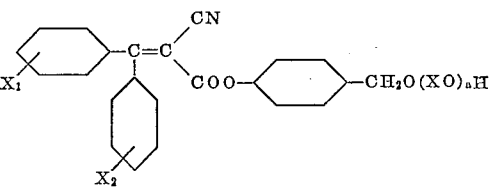
16. 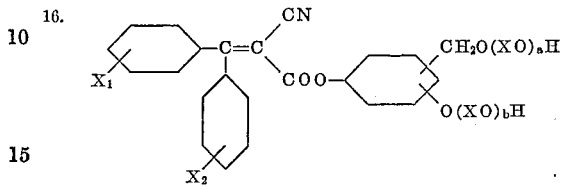
In Formulae 1 through 16, $X_1$ and $X_2$ are as defined in Formula (II) and $a$, $b$, $c$ and $d$ represent the number of oxyalkyl groups; the total of $a$, $b$, $c$ and $d$ in any compound is equivalent to $n$ in Formulae (III) through (VI). It is further clear that —(XO)— may represent the same or different oxyalkyl groups in the same molecule. Illustrations follow:
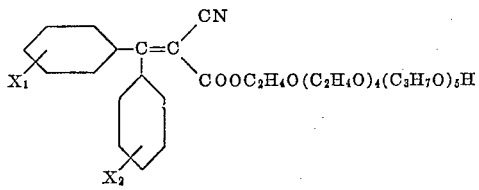
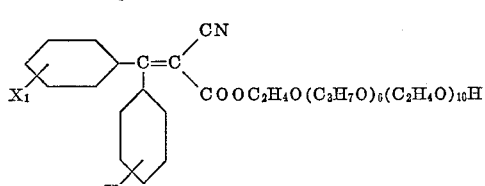
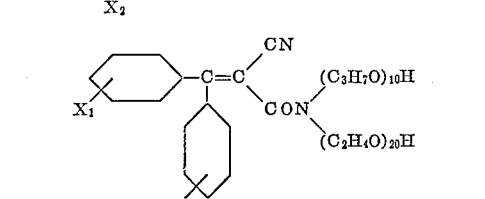
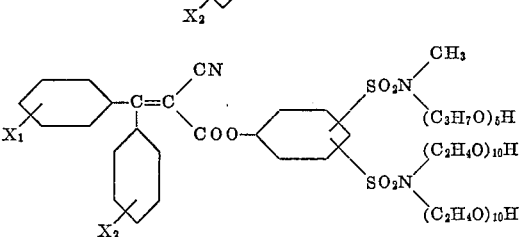
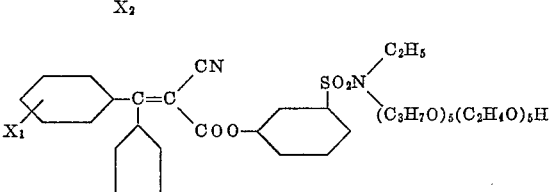
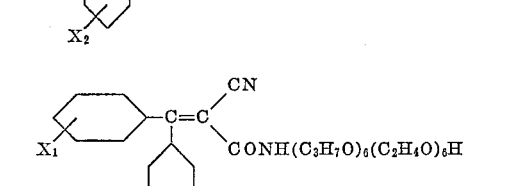

Where either or both $X_1$ and $X_2$ are hydroxyl, polyoxyalkylation thereof may be carried out if desired to give, e.g.,:

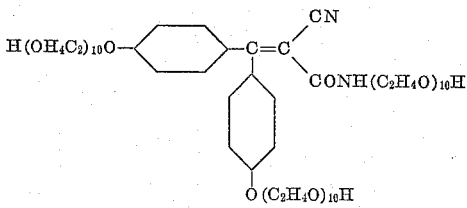

employing 30 moles of ethylene oxide per mole of α-cyano-β,β-di(4-hydroxyphenyl) acrylic acid amide.

If the phenolic hydroxyls are not to be oxyalkylated they may be esterified with, for example, benzene sulfonyl chloride and then later regenerated. Alternatively, the phenolic hydroxyls may be oxyalkylated to the exclusion of amide grouping since the latter react much more slowly.

The following examples will serve to illustrate compositions and their use within the purview of the present invention.

EXAMPLE 1

Nitrocellulose lacquer containing ultra-violet absorber

A mixture of 20 parts of solution A and 80 parts of solution B is prepared, wherein solution A consists of the following:

46 parts ½ sec. nitrocellulose
4 parts α-cyano-β,β-diphenylacrylic acid ethyl ester
35 parts of Cellolyn 502 (non-drying plasticizing alkyl resin of Hercules Powder Co.)
15 parts dibutyl phthalate and solution H consists of 35 parts butyl acetate
15 parts butanol
50 parts toluene The resulting lacquer solution is drawn out on a metal plate with a Bird film applicator to give a film of 3 mils thickness. A similar film is prepared by drawing out a lacquer formulation just as above but wherein the 4 parts of α-cyano-β,β-diphenylacrylic acid ethyl ester is replaced by 4 parts ½ sec. nitrocellulose. After exposure to light for 100 hours the film prepared without the α-cyano-β,β-diphenylacrylic acid ethyl ester develops a distinct yellow color whereas the film containing this ultra-violet absorber remains colorless on faceometer exposure for 100 hours.

EXAMPLE 2

Preparation and application of ultra-violet absorber to cellulose acetate film

α-Cyano-β,β-bis(4-chlorophenyl) acrylic acid ethyl ester is prepared by condensing ethyl cyano acetate with 4,4'-dichlorobenzophenone as follows:

Into a 500 ml. flask fitted with stirrer, thermometer, reflux condenser, water trap and heating mantle is charged:

28.25 gms. ethyl cyanoacetate (0.25 mole)
62.75 gms. 4,4'-dichlorobenzophenone (.25 mole)
3.85 gms. ammonium acetate
12 ccs. glacial acetic acid and
75 mls. benzene.

The charge is stirred 12 hours at reflux. The benzene is distilled off, the residue diluted with 150 mls. water and filtered. The lumps are crushed in a motor. The solid is slurried in 100 mls. water and filtered. The cake is washed on the funnel with 200 mls. water. The product is air dried. It is distilled at 2.5 mm. at 185°–200° C. The 16 gms. of material is recrystallized from 150 mls. ethanol+300 mls. water after treating with nuchar and filtering.

The resulting acrylic acid ester is incorporated into cellulose acetate film as follows:

0.375 gms. α-cyano - β,β - bis(4-chlorophenyl)-acrylic acid ethyl ester, 3.5 gms. ethanol, 6.5 gms. methyl Cellosolve, 9.0 gms. ethyl acetate, 26 gms. cellulose acetate dope (consisting of 3.75 gms. cellulose acetate in 21 gms. acetone) are mixed with stirring until a clear solution is obtained. The material is poured into a mold and the solvent evaporated to give a block of cast material of ⅛" thickness. A similar block is prepared in the same fashion only omitting the α-cyano - β,β - bis(4-chlorophenyl)-acrylic acid ethyl ester. The material containing the ultra-violet absorber gives better stability to light to food materials stored behind it than the cast block without the ultraviolet absorber.

EXAMPLE 3

Preparation of ultra-violet absorber and application to polyethylene

The compound α-cyano-β-phenyl-β-(4-n-dodecyloxy)-phenyl acid ethyl ester

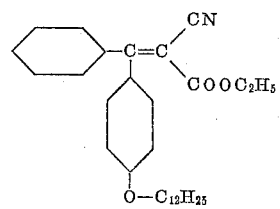

is prepared as follows:

(A) Preparation of 4-(n-dodecyl)oxybenzophenone 300 mls. of n-butyl alcohol and 4.0 gms. sodium hydroxide pellets (0.1 mole) are mixed. There is then added 19.8 gms. of 4-hydroxybenzophenone (0.1 mole). 44.2 gms. (=0.15 mole) of 1-iodo-n-dodecane is then added. The charge is stirred 15 hours at 68° C., cooled to room temp. and diluted to 1 litre volume with methanol. There is added 0.6 gms. of sodium hydroxide bringing the material to phenolphthalein alkalinity. The material is filtered to give 4-(n-dodecyl)oxybenzophenone.

(B) Condensation with ethyl cyanoacetate. The substituted benzophenone prepared above in A is condensed with ethyl cyanoacetate in the identical manner described above in Example 2 for the condensation of 4,4'-dichlorobenzophenone with ethyl cyanoacetate except that 0.25 mole of 4-(n-dodecyl)oxybenzophenone is used in place of the dihalobenzophenone of that example.

(C) The compound prepared in B above is then incorporated in polyethylene by melting at 120° C. a mixture of 99.5 g. of polyethylene wax PT95504 (Semet-Solvay) and 0.5 g. of the above ultra-violet absorber to give a solution. The material is then pressed out in a Carver press to give a film of about ½₂" thickness. Meat stored behind this film containing the ultra-violet absorber is less discolored on exposure to ultra-violet light than meat stored behind a similar film prepared without the absorber.

EXAMPLE 4

Preparation of α-cyano-β-(2-chlorophenyl)-β-(4-chlorophenyl)acrylate methyl ester This compound is prepared by the condensation of 2,4'-dichlorobenzophenone with methyl cyanoacetate in the identical manner described in Example 2 except for the substitution of an equimolar amount of 2,4'-dichlorobenzophenone for the 4,4'-dichlorobenzophenone of that example.

EXAMPLE 5

*Incorporation of ultra-violet absorber into a polyester composition*

1.0 g. of the ultra-violet light absorber of Example 4 is dissolved in 100 g. of Polylite 8000 (polyester resin of 30% styrene and 70% glyceryl phthalate maleate) containing 1% Luperco ATC (organic peroxide dispersed with a filler). A casting is made between opal glass plates treated with silicone mold release agent (Dri-Film SC–87). A gasket material is placed between the plates and they are clamped together. The polyester is poured into the mold and cured as follows: initial oven temperature=65° C., temperature is raised slowly to 90° C. and held 1 hour, then raised to 120° C. and held ½ hour to complete the curing cycle. The material is cut to size. The polyester mold made in this way gives better protection against sunlight to clothing exhibited behind it when containing ultra-violet absorber than a casting prepared in similar fashion but free of ultra-violet absorber.

EXAMPLE 6

*Preparation and application of α-cyano-β-phenyl-β-(4-methoxyphenyl)acrylate ethyl ester*

This compound is prepared from 4-methoxybenzophenone and ethyl cyanoacetate in the manner described in Example 2. A leather treating emulsion containing the above ultra-violet absorber is prepared from the following composition:

- 160 g. methyl acrylate
- 16 g. butyl acrylate
- 1.7 g. ultra-violet absorber
- 20 g. Triton X–200 dispersing agent (alkyl aryl polyether sulfonate)
- 0.3 g. ammonium persulfate
- 176 g. water This mixture is shaken until a uniform emulsion is produced which is milk white in appearance. The emulsion is then gradually poured into 500 mls. of water over a 2½ hour period. The mixture is then refluxed for 3 hours. The resultant product is then sprayed on leather and the latter pressed between plates and dried. The leather so treated shows less tendency toward yellowing than leather treated with a similar formulation omitting the ultra-violet absorber.

EXAMPLE 7

*Preparation and application of α-cyano-β,β-di-(p-tolyl) acrylic acid ethyl ester*

(A) This compound is prepared from p,p'-dimethylbenzophenone and ethyl cyanoacetate in the manner described for the compound of Example 2.

(B) The ultra-violet absorber of A is incorporated into a synthetic rubber formulation in the following manner. A 50% dispersion is made of the above ultra-violet absorber by kneading 20 g. of the compound with 20 g. of formaldehyde-naphthalene-2-sodium sulfonate (Tamol NNO) in a Werner-Pfleiderer mixer for several hours in the presence of sufficient water to keep the material in a viscous state. The material is then evaporated to dryness to give the dispersed form of the absorber. The dispersed absorber is then incorporated into an acrylonitrile-butadiene latex (Chemigum 247) employing 5% of the absorber based on the weight of the latex. The latex is then sprayed onto leather. The film prepared in this manner shows less tendency to yellow on exposure to light than a similar film prepared in the same manner but omitting the ultra-violet absorber.

EXAMPLE 8

*Preparation and application of α-cyano-β,β-diphenyl-acrylic acid phenyl ester*

(A) This compound is prepared in the manner described in Example 2 by the condensation of benzophenone with phenyl-α-cyanoacetate. The latter is prepared in the usual manner by the esterification of cyanoacetic acid with phenol.

(B) A 5% solution of the compound described in A above is prepared in methyl Cellosolve (methyl ether of ethylene glycol). Into this solution there is immersed a sponge of polyvinyl chloride foam which is made from the following formulation:

| | Parts |
|---|---|
| Marvinol VR–10 (polyvinyl chloride resin—U.S. Rubber) | 100.0 |
| Di-2-ethylhexylphthalate (DOP) | 130.0 |
| Barium cadmium stabilizer (Advance BS–105) | 3.5 |
| Celogen (p,p'-oxybis(benzenesulfonyl hydrazide) | 25 |
| | 258.5 |

The sponge is then removed, squeezed free of residual solvent, and dried in vacuo. The material thus impregnated with ultra-violet absorber is more stable to ultra-violet light than untreated material.

EXAMPLE 9

*Preparation of α-cyano-β,β-bis(4-hydroxyphenyl) acrylic acid ethyl ester*

This compound is prepared similarly to the compound of Example 2 employing 4,4'-dihydroxybenzophenone as the dibenzenesulfonyl ester followed by regeneration of dihydroxy compound after the condensation.

EXAMPLE 10

*Application of the compound of Example 9 to foamed polyurethane*

A 5% solution of α-cyano-di-(4-hydroxyphenyl)acrylic acid ethyl ester is prepared in methyl Cellosolve. Into this solution is immersed a sponge made from a linear polyester (adipic acid-ethylene glycol) with a hydroxyl number of 45 and an acid number of 1 foamed with tolylene diisocyanate. The sponge is then removed, squeezed free of residual solvent, and vacuum oven dried. The impregnated material undergoes less yellowing on exposure to ultra-violet light than untreated material.

EXAMPLE 11

*Preparation of α-cyano-β-phenyl-β-(4-biphenyl)acrylic acid ethyl ester and application to cellulose acetate*

4-phenylbenzophenone is condensed with ethylcyanoacetate as in Example 2 to give the above α-cyano-β-phenyl-β-(4-biphenyl) acrylic acid ethyl ester. This compound is applied in cellulose acetate as the compound of Example 2 to give excellent protection.

EXAMPLE 12

*Application of α-cyano-β-phenyl-β-(4-methoxyphenyl) acrylic acid ethyl ester to the stabilization of coloring matters incorporated in plastics*

A lacquer drawdown on "Krome Kote" paper (a cast coated paper) of 2% of Azosol Fast Yellow RCA (anthranilic acid→4-sulfophenylmethylpyrazolone, Cr, dicyclohexylamine salt), and 2% of the above α-cyano-β-phenyl-β-(4-methoxyphenyl)-acrylic acid ethyl ester in nitrocellulose was made as well as a comparative nitrocellulose lacquer formulation containing 2% Azosol Fast Yellow RCA without ultra-violet absorber. After 500 hours fadeometer exposure, the lacquer containing the ultra-violet absorber shows much less fading.

EXAMPLE 13

*Preparation of α-cyano-β,β-diphenylacrylic acid amide and application in cellulose acetate*

Benzophenone is condensed with an equimolar amount of cyanoacetamide as described in Example 2 to give α-cyano-β,β-diphenylacrylic acid amide. This compound is applied in cellulose acetate film as in Example 2, and gives increased light stability to food and other articles stored behind the film when containing the ultra-violet absorber.

EXAMPLE 14

*Preparation of α-cyano-β,β-diphenylacrylic acid N,N-dimethylamide and application in cellulose acetate*

Benzophenone is condensed with α-cyano-N,N-dimethylacetamide in the manner described in Example 2 to give α-cyano-β,β-diphenyl-N,N-dimethylacrylic acid amide. This ultra-violet light absorber is incorporated in cellulose acetate film in the manner described in Example 2, and when so incorporated gives protection against deterioration from ultra-violet light to cloth stored behind the film.

EXAMPLE 15

*Application of α-cyano-β,β-diphenylacrylic acid N,N-dimethylamide to epon resin*

A mixture of 2 parts of Epon 828 (polymer of alkylenebisphenol and epichlorohydrin), 1 part of m-phenylene diamine and 5% of the weight of total polymer of the above ultra-violet absorber is prepared. The material is heat set in a mold at 120° C. for 24 hours. This product shows less color change on exposure to ultra-violet light than material set in similar manner without absorber.

EXAMPLE 16

The compound of Example 9 is oxyalkylated with ethylene oxide to yield a polyoxyalkylated product in the following manner. To 1 mole of the phenol containing 1% by weight based on the weight of the phenol of potassium hydroxide there are added 6 moles of ethylene oxide while maintaining the mixture in an autoclave at 80° C. during the addition of the ethylene oxide. The resultant product disperses readily in water and may be used to treat hydrophilic materials such as paper and other cellulosic products such as cotton, jute and the like. This polyoxyalkylated product is also an excellent dispersing agent for pigments and dyestuffs, and when used in combination with these materials, it affords outstanding protection against ultra-violet light degradation.

EXAMPLE 17

The procedure of Example 16 is repeated employing 20 moles of ethylene oxide. The resultant product has outstanding surfactant properties and may be used to prepare emulsions of the oil-in-water and water-in-oil types. Such emulsions are well stabilized against ultra-violet light degradation.

EXAMPLE 18

*Preparation of α-cyano-β-phenyl-β-(2-sulfamylphenyl) acrylic acid ethyl ester*

This compound is prepared similarly as the compound of Example 2 employing 2-sulfamyl benzophenone.

EXAMPLE 19

The compound of Example 18 is oxypropylated with 9 moles of propylene oxide to yield a water and oil soluble surface active ultra-violet absorbing compound.

EXAMPLE 20

This example illustrates the outstanding improvement effected by the compound herein disclosed in protecting and stabilizing high polymers of formaldehyde.

(A) *Preparation of polymer (polyoxymethylene).*—A solution of monomeric formaldehyde prepared in the manner hereinafter described in 800 ml. of dimethyl ether is stirred at −101° C. to −105° C. while gradually adding, over a period of about 30 minutes, 0.02 mole percent based on the weight of the formaldehyde a triphenyl phosphine dissolved in 40 ml. of diethyl ether. Stirring is continued for an additional 70 minutes and the resultant slurry is filtered and the solid product washed with 2 portions of diethyl ether (650 ml. each), the first portion at a temperature of solid carbon dioxide/acetone bath and the second at room temperature. This washed product is then air dried and finally vacuum dried. The resultant polymer is mixed with 1% of its weight of α-cyano-β,β-diphenyl acrylic acid ethyl ester and films of the resultant polymer are formed at 190–200° C. and 2000 p.s.i. pressure.

The procedure of part A is repeated except that the α-cyano-β,β-diphenyl acrylic acid ethyl ester is omitted. The films so prepared are placed in a weatherometer and after 30 days it is observed that the film with the stabilizer is substantially unchanged, there being no sign of degradation as evidenced by surface crazing and cracks. The unstabilized film shows severe crazing and cracks.

(B) *Preparation of monomeric formaldehyde used in part A.*—The monomeric formaldehyde used in the preparation of the polymer described in part A is prepared by the thermal decomposition of α-polyoxymethylene (prepared as described in C below). The α-polyoxymethylene is heated to between 150° C. and 300° C. under a pressure of 100 to 125 mm. whereby decomposition to formaldehyde takes place. The vaporized formaldehyde is then passed through a battery of 12 U-tubes maintained at −40° C. to a suitable collection flask containing a solvent cooled to about −80° C.

(C) *The α-polyoxymethylene used to prepare the monomeric formaldehyde in part B and employed to prepare the polymer of part A is produced as follows.*—1000 g. of a 33% aqueous sodium hydroxide solution is added slowly over a period of 2 hours to 84.4 kg. of 39.8% aqueous formaldehyde free of methanol. During the addition, the mass is vigorously agitated and the temperature controlled at 40° C. Stirring is continued for an additional 12 hours. The mass is then filtered and washed with water until the filtrate is neutral and thereafter washed with methanol. There results a powdery white solid which is dried in a vacuum oven at 40° C. for 48 hours.

EXAMPLE 21

Example 20 is repeated except that 5 g. of the acrylic ethyl ester are mixed with 95 g. of vacuum dried polymer and heat set at 190° C. as above. The resultant polymer is found to contain about 5% of this additive in contrast to about 1% in the product of Example 20. Excellent stabilization of the polyoxymethylene is obtained.

EXAMPLE 22

A high molecular weight formaldehyde polymer is prepared similarly as in Example 20 without any ultra-violet light absorber. To 100 g. of granular polymer there is added and thoroughly admixed therewith, 2 g. of α-cyano-β,β-diphenyl acrylic acid ethyl ester. Films are then prepared from this composition in the manner described in Example 20. Excellent stabilization is effected thereby.

EXAMPLE 23

Examples 20 through 22 are repeated employing as the ultra-violet absorber, however, (1) α-cyano-β,β-(4-chlorophenyl) acrylic acid ethyl ester
(2) α-cyano-β-(2-chlorophenyl)-β-(4-chlorophenyl) acrylic acid methyl ester
(3) α-cyano-β,β-bis(4-hydroxyphenyl) acrylic acid ethyl ester The improvement in the stability of the polyoxymethylenes above described is deemed remarkable in view of the fact that many other ultra-violet absorbing materials have proved to be completely worthless in such combinations. It is significant that the compounds herein contemplated as stabilizers may be employed during the polymerization of the formaldehyde and do not adversely affect the course thereof.

The compounds employed in this invention are in general soluble in a great variety of solvents, plastics, resins, waxes and the like, and therefore are particularly adaptable for the stabilization of a great variety of different types of organic materials. The non-oxyalkylated products are insoluble in water. Those compounds which contain smaller amounts of oxyalkyl groups, that is, up to about 4 to 6 groups per molecule, are in general soluble in the more polar organic solvents and fairly readily dispersible in water. The compounds containing larger amounts of alkylene oxide, that is, above about 6 moles per mole of reactive hydrogen containing compound, range from soluble to extremely soluble in water, the solubility increasing as the number of oxyalkyl groups are increased.

The amount of stabilizer to be incorporated is not particularly critical except that sufficient should be present to effect the desired degree of stabilization, and no more should be employed than is necessary to obtain this result. In general, between 0.1% and 10% based on the solids content of the organic material may be used, and preferably between about 0.5% to about 2%. As exemplified above, the ultra-violet absorbers employed with this invention can be used not only to stabilize clear films, plastics and the like, but they may be employed in opaque, semi-opaque or translucent materials, the surface of which is susceptible to degradation by ultra-violet light. Among each different types of materials, most of which have been exemplified, are foamed plastics, opaque films and coatings, opaque papers, translucent and opaque fibers, transparent and opaque colored plastics, fluorescent pigments, polishes, creams, lotions and the like whether opaque, clear, or translucent. The compounds employed in this invention give outstanding protection to paint, enamel and varnish films against fading of pigments and dyes contained therein. The most outstanding and significant achievement of the compounds used in this invention lies in the remarkable ability of these compounds to protect and stabilize polyoxymethylene and nitrocellulose containing compositions against ultra-violet light degradation. The compounds used in the compositions of this invention have been found to be at least five times as effective in such stabilizing situations as the heretofore employed hydroxybenzophenones known for such uses.

The compounds used in the present invention have also been found to be admirably suited for incorporation into the transparent or translucent backings of the various pressure sensitive type adhesive tapes presently in common use. By the employment of these compounds in such a manner, the adhesive nature of the pressure sensitive adhesive is remarkably preserved. Not only may the compounds be incorporated directly into the backing, but they may be used as an overcoating in a transparent or translucent film coating base employing as the film former, any suitable material which will adhere to the tape back. Thus in the case of a regenerated cellulose tape, one may coat the back thereof with one of the cellulosic lacquers hereinbefore described in Examples 1 and 2. For direct incorporation into a film of regenerated cellulose, one may employ any of the compounds herein disclosed, and particularly those which have been polyoxyalkylated as described, for example, in Example 17. In this instance, it is preferred to impregnate the regenerated cellulose in the gel state before final drying thereof.

Other variations in and modifications of the described processes which will be obvious to those skilled in the art can be made in this invention without departing from the scope or spirit thereof.

We claim:

1. An ultra-violet light stabilized organic composition containing in an amount sufficient to stabilize said organic composition a compound devoid of nitro groups and having the formula:

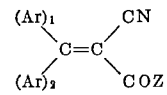

wherein $(Ar)_1$ and $(Ar)_2$ are aromatic carbocyclic nuclei devoid of nuclear bonded amino groups, Z is selected from the group consisting of OY and

and Y, $Y_1$ and $Y_2$ are selected from the group consisting of hydrogen and organic radicals.

2. An ultra-violet light stabilized organic composition containing from about 0.1 to about 10% based on the weight of said organic composition, a compound devoid of nitro groups and having the formula:

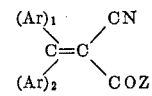

wherein $(Ar)_1$ and $(Ar)_2$ are aromatic carbocyclic nuclei devoid of nuclear bonded amino groups, Z is selected from the group consisting of OY and

and Y, $Y_1$ and $Y_2$ are selected from the group consisting of hydrogen and organic radicals.

3. A composition as defined in claim 1 wherein $(Ar)_1$ and $(Ar)_2$ are benzene nuclei.

4. A composition as defined in claim 2 wherein $(Ar)_1$ and $(Ar)_2$ are benzene nuclei.

5. A composition as defined in claim 2 wherein $(Ar)_1$ and $(Ar)_2$ are phenyl.

6. A composition as defined in claim 2 wherein $(Ar)_1$ and $(Ar)_2$ are halophenyl.

7. A composition as defined in claim 2 wherein $(Ar)_1$ and $(Ar)_2$ are alkyl substituted phenyl.

8. A composition as defined in claim 2 wherein $(Ar)_1$ and $(Ar)_2$ are hydroxyphenyl.

9. An ultra-violet light stabilized film forming organic composition containing dispersed therein in an amount sufficient to stabilize said organic composition a compound devoid of nitro groups and having the formula:

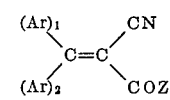

wherein $(Ar)_1$ and $(Ar)_2$ are aromatic carbocyclic nuclei devoid of nuclear bonded amino groups, Z is selected from the group consisting of OY and

and Y, $Y_1$ and $Y_2$ are selected from the group consisting of hydrogen and organic radicals.

10. A composition as defined in claim 9 wherein the film former is nitrocellulose, $(Ar)_1$ and $(Ar)_2$ represent benzene nuclei, and Z represents oxyalkyl.

11. A composition as defined in claim 10 wherein the dispersed compound is $\alpha$-cyano-$\beta,\beta$-diphenyl acrylic acid ethyl ester.

12. An ultra-violet light stabilized organic plastic composition containing dispersed therein from about 0.1% to about 10% by weight based on the weight of said organic plastic composition a compound devoid of nitro groups and having the formula:

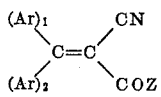

wherein $(Ar)_1$ and $(Ar)_2$ are aromatic carbocyclic nuclei devoid of nuclear bonded amino groups, Z is selected from the group consisting of OY and

and Y, $Y_1$ and $Y_2$ are selected from the group consisting of hydrogen and organic radicals.

13. A composition as defined in claim 12 wherein the organic plastic composition is cellulose acetate having dispersed therein α-cyano-β,β-(4-chlorophenyl)-acrylic acid ethyl ester.

14. A composition as defined in claim 12 wherein the organic plastic composition is polyethylene having dispersed therein α - cyano - β - phenyl - β-(4-n-dodecyl)oxyphenylacrylic acid ethyl ester.

15. A composition as defined in claim 12 wherein the organic plastic composition is a polyester resin having dispersed therein α-cyano-β-(2-chlorophenyl)-β-(4'-chlorophenyl)-acrylic acid methyl ester.

16. A composition as defined in claim 12 wherein the organic plastic composition is a polyurethane resin having dispersed therein α - cyano - β,β - bis-(4-hydroxyphenyl)-acrylic acid ethyl ester.

17. A composition as defined in claim 2 wherein the organic composition is a coloring matter.

18. An ultra-violet light stabilized film forming organic composition containing dispersed therein in an amount sufficient to stabilize said organic composition a compound devoid of nitro groups and having the formula:

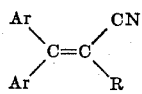

wherein Ar represents a phenyl radical, substituted by a member selected from the group consisting of hydroxy and alkoxy groups, and wherein R represents a member selected from the group consisting of COOH and COX wherein X represents a member selected from the group consisting of substituted alkyl radicals, unsubstituted alkyl radicals, amino groups and substituted amino groups.

19. A composition of improved stability comprising a polyoxymethylene and 0.1 to 10% by weight of said polyoxymethylene of a photostabilizer having the formula

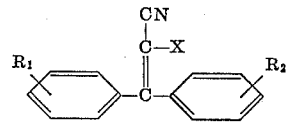

wherein $R_1$ and $R_2$ are groups selected from the class consisting of hydrogen, alkyl groups of 1–4 carbon atoms, alkoxy groups of 1–12 carbon atoms, and chlorine, and X is a group selected from the class consisting of carboalkoxy groups of 1–4 carbon atoms, carboxamide, and carboxamides substituted with at least one alkyl group of 1–4 carbon atoms.

20. A composition of improved photostability comprising a polyoxymethylene and 0.1 to 5% by weight of alpha-carbethoxy-beta-phenyl cinnamonitrile.

21. A film comprising a composition of claim 19.

22. A shaped article comprising the composition of claim 19.

References Cited

UNITED STATES PATENTS

| | | | |
|---|---|---|---|
| 1,994,596 | 3/1935 | Staud et al. | 252—300 |
| 2,122,828 | 7/1938 | Wiegund et al. | 252—300 |
| 2,222,532 | 11/1940 | Eggert et al. | 252—300 |
| 2,440,070 | 4/1948 | Blout et al. | 252—300 |
| 2,558,047 | 6/1951 | Gloor | 106—186 |
| 2,748,010 | 5/1956 | Allewelt | 106—186 |
| 2,853,397 | 9/1958 | Seibert et al. | 106—186 |

FOREIGN PATENTS 351,508   2/1930   Great Britain.

MORRIS LIEBMAN, *Primary Examiner.*

JOHN R. SPECK, J. REBOLD, *Examiners.*

A. LIEBERMAN, *Assistant Examiner.*

UNITED STATES PATENT OFFICE
CERTIFICATE OF CORRECTION

Patent No. 3,337,357                          August 22, 1967

Albert F. Strobel et al.

It is hereby certified that error appears in the above numbered patent requiring correction and that the said Letters Patent should read as corrected below.

Column 5, line 54, "p" should read -- m --; same column 5, that portion of formula (b) reading Column 6, that portion of formula (c) reading

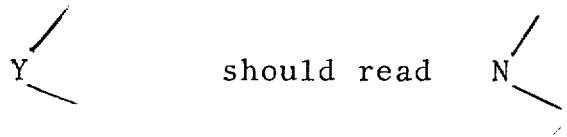

Column 9, line 49, "faceometer" should read -- fadeometer --.

Signed and sealed this 19th day of August 1969.

(SEAL)
Attest:

EDWARD M. FLETCHER, JR.                    WILLIAM E. SCHUYLER, JR.
Attesting Officer                             Commissioner of Patents